(No Model.) 3 Sheets—Sheet 2.
E. G. LATTA.
VELOCIPEDE.
No. 443,663. Patented Dec. 30, 1890.
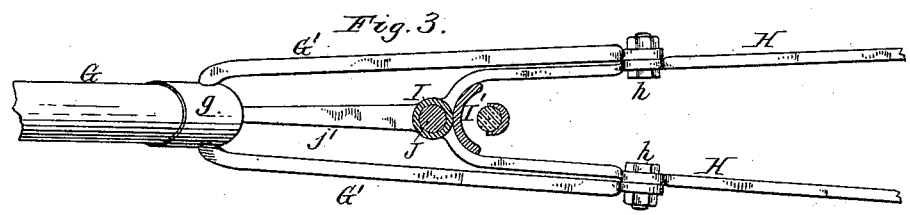
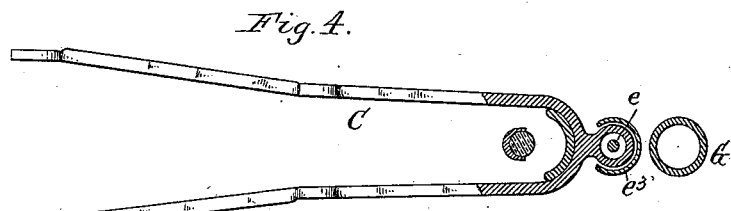
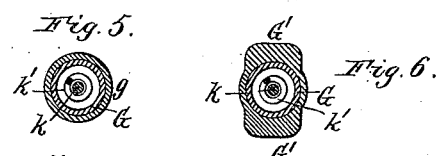
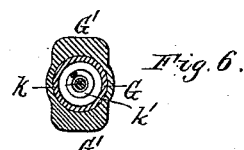
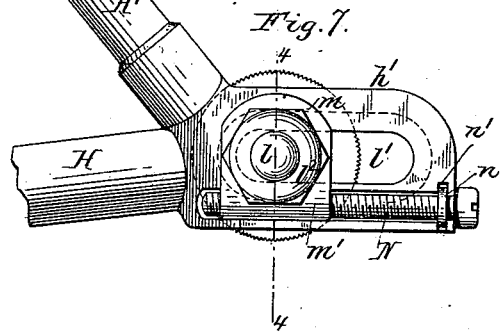
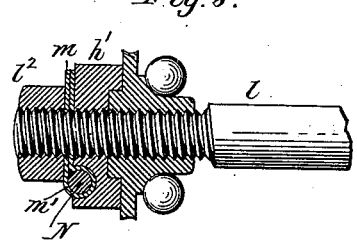
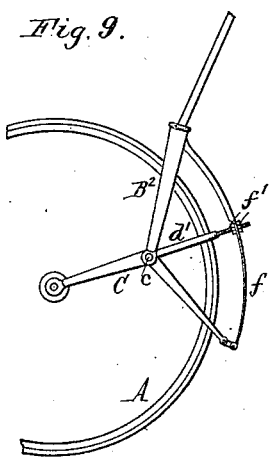
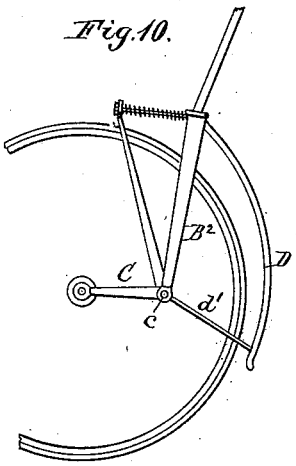
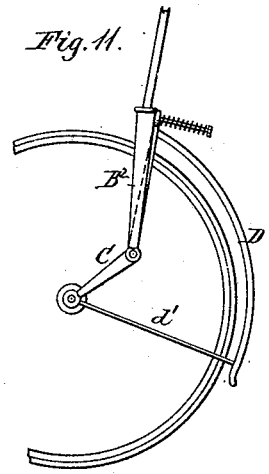
Witnesses
Jacob Nussenblatt
Emil Neuhart
E. G. Latta Inventor
By Wilhelm & Bonner
Attorneys (No Model.)   3 Sheets—Sheet 3.
E. G. LATTA.
VELOCIPEDE.
No. 443,663.    Patented Dec. 30, 1890.
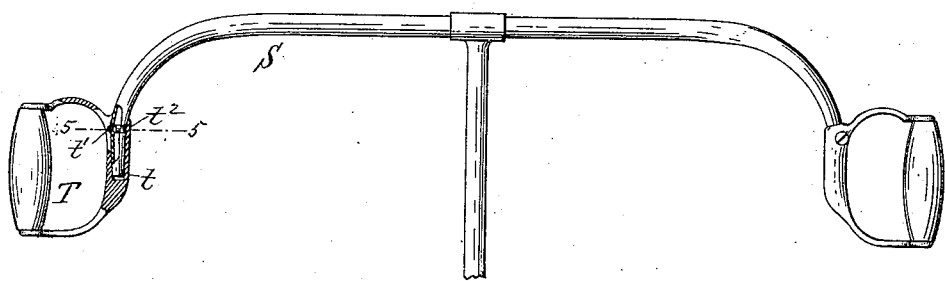
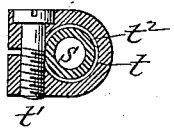

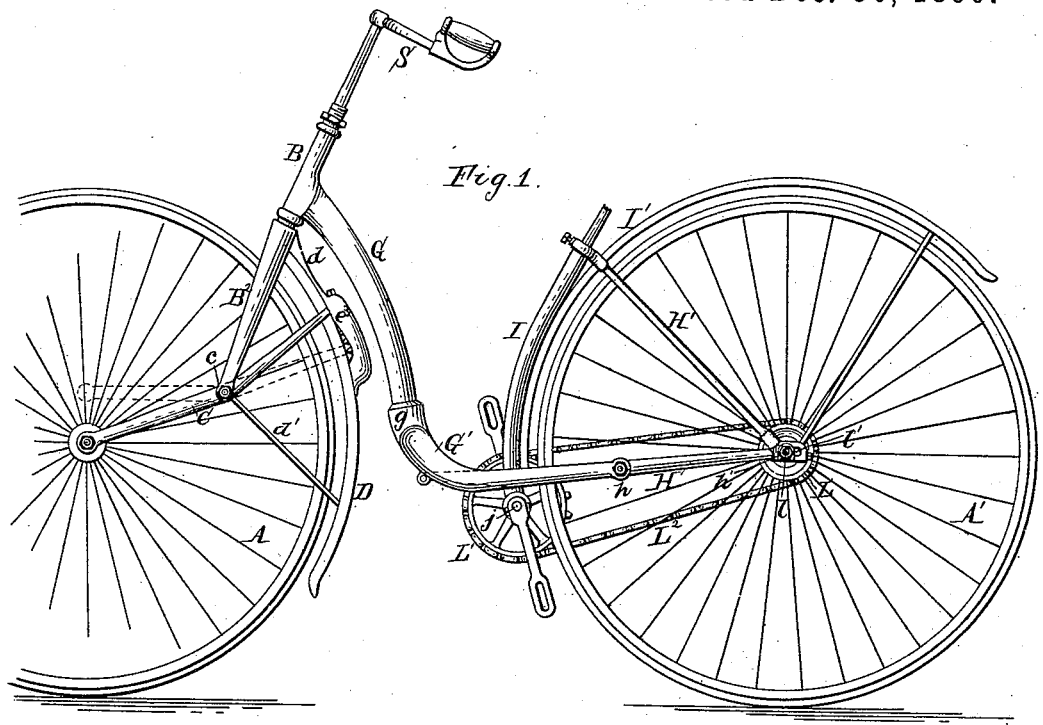
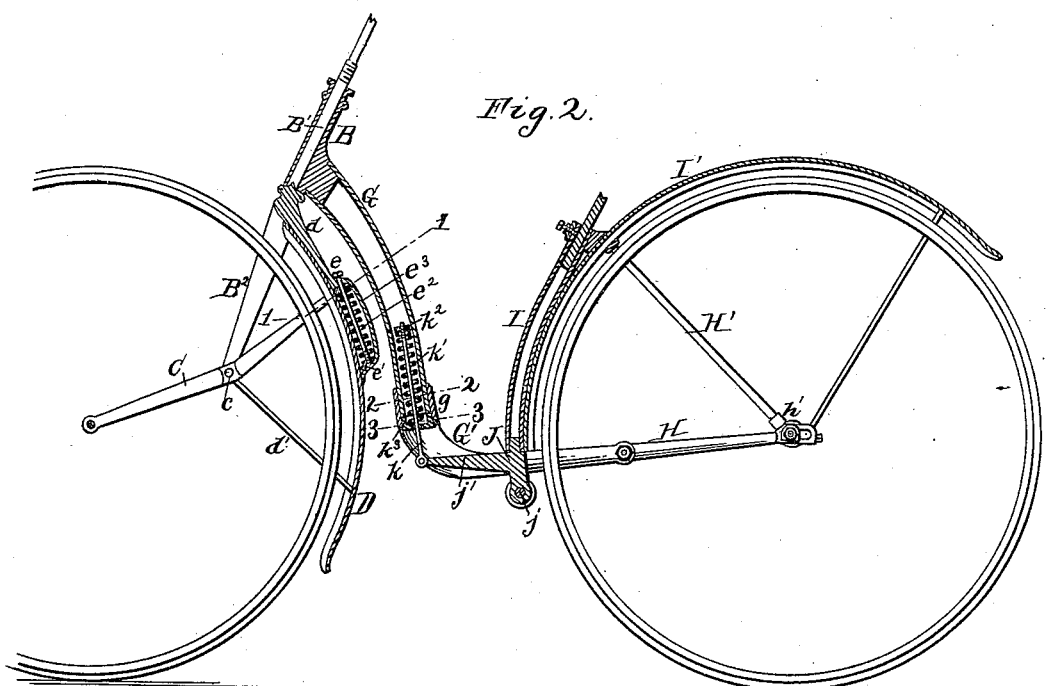

UNITED STATES PATENT OFFICE.

EMMIT G. LATTA, OF FRIENDSHIP, NEW YORK.

VELOCIPEDE.

SPECIFICATION forming part of Letters Patent No. 443,663, dated December 30, 1890.

Application filed May 15, 1890. Serial No. 351,933. (No model.)

*To all whom it may concern:*

Be it known that I, EMMIT G. LATTA, a citizen of the United States, residing at Friendship, in the county of Allegany and State of New York, have invented new and useful Improvements in Velocipedes, of which the following is a specification.

This invention relates to a velocipede which is more particularly designed for use by women; and it has for its principal object to produce a bicycle having a yielding frame which may be adjusted to suit riders of different weight and to construct the frame in such manner that the momentum of the rider assists in lifting the rear wheel over obstructions in the road.

My invention has the further object to render the part of the frame which supports the saddle capable of rearward depression to facilitate mounting and dismounting; also, to improve the means for adjusting the driving-chain and to adapt a spade-handle to the handle-bar in a manner to render it adjustable vertically as well as toward and from the center of the machine, so as to afford more room between the handles than heretofore.

In the accompanying drawings, consisting of three sheets, Figure 1 is a side elevation of my improved velocipede. Fig. 2 is a sectional elevation thereof. Fig. 3 is a fragmentary top plan view, partly in section, of the rear frame of the machine on an enlarged scale. Fig. 4 is a cross-section in line 1 1, Fig. 2, on an enlarged scale. Figs. 5 and 6 are cross-sections in lines 2 2 and 3 3, Fig. 1, on an enlarged scale. Fig. 7 is a side elevation of the rear portion of the rear frame, on an enlarged scale, showing the chain-adjusting mechanism. Fig. 8 is a vertical section in line 4 4, Fig. 7. Figs. 9, 10, and 11 are fragmentary views illustrating modified constructions of the front fork. Fig. 12 is an enlarged top plan view, partly in section, of the handle-bar and handle. Fig. 13 is a cross-section in line 5 5, Fig. 12.

Like letters of reference refer to like parts in the several figures.

A represents the front steering-wheel, and A' the rear driving-wheel.

B is the rearwardly-inclined steering-head, which is arranged in a plane extending downwardly and forwardly in rear of the steering-wheel axle, and B' is the steering-post.

$B^2$ is the main front fork connected to the lower end of the steering-post, and which straddles the upper rear portion of the front wheel.

C is an auxiliary front fork extending from the front axle rearwardly beyond the rim of the front wheel and pivoted between its ends to the lower end of the main fork, as shown at $c$. The pivot $c$ is preferably located in rear of the front-wheel axle and slightly above the same, as shown in Figs. 1 and 2.

D is the mud-guard extending over the rear portion of the front wheel and secured at its upper end to a rearwardly and downwardly extending arm $d$, formed with the crown of the main front fork.

$d'$ is a brace extending from the lower portion of the mud-guard D to the pivot $c$.

$e$ is a bolt arranged with its upper portion in a perforated lip or flange formed at the lower end of the arm $d$, and $e'$ is a screw-nut arranged upon the lower end of the bolt $e$.

$e^2$ is a spiral spring surrounding the bolt $e$ and resting upon the nut $e'$. The upper rear end of the auxiliary front fork rests upon the spring $e^2$ and is provided with an opening through which the bolt $e$ passes. The bolt $e$, surrounding spring $e^2$, and nut $e'$ are inclosed by a sheet-metal housing or casing $e^3$, which is secured at its upper end to the arm $d$ and at its lower end to the mud-guard D.

The rear ends of the arms constituting the auxiliary front fork are united outside or in rear of the mud-guard D, so as to support each other and thereby effectually retain the front wheel in proper alignment. By supporting the rear end of the auxiliary fork in the manner shown the weight carried by the front wheel is brought upon the spring $e^2$ in such manner as to cause the auxiliary fork to yield and permit the front wheel to bound upon striking an obstruction or falling into a rut, as indicated by dotted lines in Fig. 1. The spring $e^2$ is located in the longitudinal center-line of the machine, where it is out of the way, and as the auxiliary fork consists of one continuous piece but a single spring is required.

The main and auxiliary front forks are connected, respectively, with the steering-post and mud-guard outside of the front-wheel rim at different points of the circumference of the wheel, by which construction the wheel is held in line with practically the same firmness as if the fork were of the ordinary rigid form.

The screw-nut $e$ is held against turning in the housing, and the opening in which the upper end of the bolt is supported is smooth, so that upon turning the bolt in the proper direction by a wrench applied to its head the screw-nut is caused to approach the head of the bolt, thereby compressing the spring and increasing its tension. By properly adjusting the bolt the tension of the spring may be exactly regulated in accordance with the weight of the rider.

The part of the auxiliary fork in rear of the pivot $c$ is preferably arranged at an angle to the part in front of the pivot, as by this construction the stiffness of the fork is considerably increased. The fork is also rendered stiffer and enabled to more effectually resist twisting strains by the arrangement of the auxiliary fork at some distance from the lower end of the steering-post. The pivot $c$ of the auxiliary fork is located at about the center of the fork to afford the necessary movement of the front wheel without producing excessive movement of the supporting-spring; but the location of this pivot may be changed without materially affecting the action of the spring.

In the modified construction of the front frame illustrated in Fig. 9 the rear part of the auxiliary fork extends downwardly from the pivot $c$, and the lower portion $f$ of the mud-guard consists of a flat spring which is connected at its lower end to the rear end of the auxiliary fork. The weight brought to bear upon the main fork is transmitted to the auxiliary fork, as in the construction first described, and when the front wheel strikes an obstruction the spring $f$ is deflected forwardly. In this construction the brace $d'$ is located above the angular rear portion of the auxiliary fork and terminates in a screw-bolt. This bolt passes through an opening in the spring and the tension of the latter is regulated by adjusting-nuts $f'$, arranged upon the screw-bolt and bearing against opposite sides of the spring.

In the modified construction illustrated in Fig. 10 the upper portion of the auxiliary fork is arranged in front of the main fork, and the resisting-spring is arranged between the upper end of the auxiliary fork and the crown of the main fork, the adjusting-bolt being arranged in an opening in the front side of the fork-crown, and the tension of the spring being increased by screwing said bolt farther into the crown.

In the modification of the front frame shown in Fig. 11 the upper part of the auxiliary fork is arranged between the arms of the main fork, and the upper end of the auxiliary fork bears against a spring, which in turn bears against a nut mounted upon the outer end of a horizontal adjusting-bolt arranged in the rear side of the main-fork crown.

G represents the hollow reach or perch extending downwardly and rearwardly from the steering-head in the usual manner.

H is the lower rear fork, and H' the upper rear fork. The lower end of the reach is connected with the lower rear fork by arms G', arranged on opposite sides of the rear wheel. The arms G' are secured at their front ends to the reach by a union $g$, and are pivoted at their rear ends to the arms of the fork H by transverse bolts $h$. The rear ends of the upper and lower rear forks are united at the hub of the rear wheel by a union $h'$.

I is the saddle-post, supported upon the front end of the lower rear fork, and I' the mud-guard covering the rear wheel and attached to the upper rear fork. The saddle-post and lower rear fork are connected by a union J, in which the crank-shaft $j$ is supported.

$j'$ is a forwardly-extending arm formed on the union J.

$k$ is an upright rod or bolt pivoted at its lower end to the front end of the arm $j'$ by a horizontal bolt, and extending into the lower portion of the hollow reach, and $k'$ is a spiral spring surrounding the bolt $k$ and secured at its upper end to a screw-nut $k^2$, arranged at the upper end of the bolt, and at its lower end to a box-nut $k^3$, closing the lower end of the hollow reach. The nut $k^3$ is slotted for the passage of the bolt. Upon removing the horizontal pivot-bolt and turning the bolt $k$ in the nuts $k^2$ $k^3$ the tension of the spring $k'$ is increased or diminished. By this construction of the frame the spring $k'$ sustains the greater portion of the rider's weight, and, being inclosed within the reach, the spring is hidden from view and protected from dirt and rain. The upward play of the spring $k'$ is limited by the crank-shaft bracket striking the under side of the arms G'.

The pivot-joints connecting the arms G' with the lower rear fork are located beside the rear wheel, directly underneath the seat or saddle, and the seat and driving-gear are carried by the rear-wheel frame. By this relative arrangement of the pivot-joints the rider is caused or permitted to move forwardly in an arc concentric with the pivot-joints at the instant the rear wheel rises to pass over an obstacle, whereby the forward momentum of the rider assists in passing the obstruction to much better advantage than if the pivots were at or near the rear-wheel hub, in which latter case the seat descends when the rear wheel passes an obstruction. The tendency to pull the seat forwardly in lifting on the handles is also less by this arrangement of the pivots than when the same are located at the hub of the rear wheel, and such location of the pivots is also more desirable than an arrangement thereof between the wheels, because the angle of the steering-head is changed to a less extent by the depression of the central part of the frame.

$l$ represents the axle of the rear wheel arranged in horizontal slots $l'$ in the rear-fork lugs or unions $h'$.

L is the sprocket-wheel mounted upon the rear axle, L' the sprocket-wheel secured to the crank-shaft, and L² the driving-chain running around said wheels.

$l^2$ is the screw-nut applied to the end of the rear axle, and $m$ is a washer clamped between the union $h'$ and said nut and bearing against the outer side of said union, whereby the axle is tightly clamped in place. The washer $m$ is provided with a cylindrical lug $m'$, having a screw-threaded opening extending lengthwise thereof. This lug and washer are preferably constructed of a double strip of sheet metal having its bent or looped portion enlarged and internally threaded to form the lug, as represented in Fig. 8.

N is a rotary adjusting-screw arranged with its threaded front portion in the threaded lug $m'$, and held against lengthwise movement by an annular flange $n$, formed at the outer portion of the screw and seated in a curved recess $n'$ in the union $h'$, as clearly represented in Fig. 7. The threaded lug $m'$ and adjusting-screw N are arranged in a longitudinal recess or cavity formed in the outer side of the union $h'$, as shown. Upon loosening the nut $l^2$ and turning the adjusting-screw in one or the other direction the lug $m'$ and the rear axle carried by the same are shifted backwardly or forwardly in the slotted union $h'$, whereby the tension of the drive-chain is accurately adjusted. After adjusting the axle the same is again clamped in the union by tightening the nut $l^2$. By this construction of the adjusting device the screw acts to force the rear axle forwardly as well as backwardly, which feature is very desirable in case the chain is drawn too tight in shifting the wheel backwardly.

S represents the handle-bar secured to the upper end of the steering-post and having its ends curved backwardly about at right angles to the central portion of the bar to enable the handles to be easily reached from the saddle.

T are the handles adjustably secured to the ends of the handle-bar, and which are of the type known as "spade-handles." The frame of each handle is provided with a socket $t$, arranged substantially parallel with the handle, which socket fits over the bent end of the handle-bar. The front portion of this socket is split longitudinally, and the socket is secured upon the handle-bar by a transverse clamping-bolt $t'$, passing through the split portions of the socket and entering an annular groove $t^2$, formed in the end portion of the handle-bar. Upon loosening the clamping-bolt $t'$ the handle may be turned upon the curved end of the handle-bar as a pivot, so as to change the elevation of the handles as well as the distance between the same, the angle of the handle relatively to the handle-bar remaining the same in all positions of the handle. After adjusting the handle the same is again clamped in position by tightening the bolt $t'$.

For tall riders the handles are usually set about as illustrated in Fig. 1, the same being above and outside the handle-bar, while for riders of small stature they are adjusted to stand below and inside of the bar, so as to lower the handles and also bring them closer together. For riders of medium stature the handles are set horizontally or about on a level with the ends of the bar, either inside or outside thereof, as may be most convenient.

The arrangement of the socket parallel to the handle is more advantageous than its arrangement at right angles thereto, the former construction affording more room between the handles than the latter.

I claim as my invention—

1. The combination, with the steering-wheel and the steering-post having a main fork, of a mud-guard arranged over the rear side of the steering-wheel and secured to the base of the steering-post, an auxiliary fork carrying the steering-wheel and pivoted to the main fork, and a spring supported upon the mud-guard and resisting the movement of the auxiliary fork, substantially as set forth.

2. The combination, with the steering-wheel and the steering-post, of a main fork connected with the steering-post, an auxiliary fork carrying the steering-wheel and jointed to the main fork, a mud-guard secured to the steering-post, and a brace connecting the lower portion of the mud-guard with the main fork, substantially as set forth.

3. The combination, with a steering-wheel, its frame, and a steering-post having a main fork, of a yielding auxiliary fork pivoted between its ends to the main fork and carrying the front wheel at its outer end, a bolt attached to the frame of the steering-wheel and having a nut held against turning on the bolt, and a spring surrounding said bolt and resting upon said nut and supporting the inner end of the auxiliary fork, substantially as set forth.

4. The combination, with a steering-wheel, its frame, and a steering-post having a main fork, of a yielding auxiliary fork pivoted between its ends to the main fork and carrying the front wheel at its outer end, a bolt attached to the frame of the steering-wheel and having a nut, and a spring arranged upon said bolt, resting upon said nut, and supporting the inner end of the auxiliary fork, and a housing inclosing said spring and holding said nut against turning on the bolt, substantially as set forth.

5. The combination, with the front and rear wheel frames and a hollow reach, of a joint connecting the reach with the rear-wheel frame and a spring arranged within the hollow reach and resisting the movement of the parts of the frame upon each other, substantially as set forth.

6. The combination, with the front and rear wheel frames and a hollow reach, of a joint connecting the reach with the rear-wheel frame, a spring arranged within the hollow reach and resisting the movement of the parts of the frame upon each other, and an adjusting device for regulating the tension of said spring, substantially as set forth.

7. The combination, with the front and rear wheel frames, of the driving-gear supported upon the rear-wheel frame, and a joint connecting the front and rear wheel frames and located between the hub and rim of the rear wheel, substantially as set forth.

8. The combination, with the steering-head and the front and rear wheel frames, of a reach attached at its front end to the steering-head and jointed at its rear end to the rear-wheel frame beside the rear wheel, and a spring connecting the front end of the rigid rear-wheel frame to the reach, substantially as set forth.

9. The combination, with the steering-head, the front-wheel frame, and the rigid rear-wheel frame, supporting the saddle and extending forwardly beyond the saddle, of a hollow reach attached at its front end to the steering-head and pivoted at its rear end to the rear-wheel frame beside the rear wheel, and a spring inclosed within the hollow reach and supporting the front end of the rear-wheel frame, substantially as set forth.

10. The combination, with the front-wheel frame, of the reach bifurcated at its rear end and attached at its front end to the front-wheel frame, a rear-wheel frame pivoted to the bifurcated rear end of the reach and provided with an arm projecting forwardly between the jaws of the reach, and a spring arranged on the reach and attached to the forwardly-projecting arm of the rear fork, substantially as set forth.

11. The combination, with the front-wheel frame, of the hollow reach attached at its front end to the front-wheel frame, a rear-wheel frame pivoted to the reach between the hub and rim of the rear wheel and having a forwardly-projecting arm, a bolt attached to said arm, an adjusting-nut arranged on said bolt, and a supporting-spring arranged in the hollow reach and surrounding said bolt and inclosed by said reach, substantially as set forth.

12. The combination, with the frame of a velocipede, having a longitudinal slot and a wheel-axle arranged in said slot and provided with a clamping-nut, of a washer arranged upon the axle between the frame and clamping-nut and having a threaded lug and an adjusting-screw held against lengthwise movement on the frame and engaging with the threaded lug of the washer, substantially as set forth.

13. The combination, with the frame of a velocipede, having a longitudinal slot and a wheel-axle arranged in said slot and provided with a check-nut, of a washer interposed between the frame and check-nut, and consisting of a doubled strip of sheet metal having its looped or doubled portion internally threaded, and an adjusting-screw held against longitudinal movement on the frame and engaging in the threaded portion of said washer, substantially as set forth.

14. The combination, with a velocipede handle-bar having backwardly-bent ends, of a spade-handle having an attaching-socket arranged substantially parallel with the handle, substantially as set forth.

15. The combination, with a handle-bar having backwardly-bent ends, of an adjustable spade-handle attached to the bent ends of the bar by a pivot arranged substantially parallel with the handle, substantially as set forth.

16. The combination, with a handle-bar having backwardly-bent ends, of an adjustable spade-handle having an attaching-socket arranged parallel with the handle and a clamping device whereby the socket is secured upon the handle-bar, substantially as set forth.

17. The combination, with a handle-bar having backwardly-bent ends, of an adjustable spade-handle having a split attaching-socket arranged parallel with the handle and a clamping bolt or screw passing through the split portion of the socket, substantially as set forth.

Witness my hand this 5th day of May, 1890.

EMMIT G. LATTA.

Witnesses:
FRED H. RICE,
CHAS. J. RICE.